Feb. 20, 1968  J. H. ROGERS ETAL  3,369,350
SHREDDER IMPLEMENT
Filed Nov. 24, 1964  2 Sheets-Sheet 1

INVENTORS
JOHN HARLAN ROGERS
JOHN W. SAXTON
BY Dick & Zarley
ATTORNEYS

INVENTORS
JOHN HARLAN ROGERS
JOHN W. SAXTON
BY Dick & Zarley
ATTORNEYS

United States Patent Office 3,369,350
Patented Feb. 20, 1968

3,369,350
SHREDDER IMPLEMENT
John Harlan Rogers and John W. Saxton, Fort Dodge,
Iowa, assignors to The Standard Engineering Company,
Fort Dodge, Iowa
Filed Nov. 24, 1964, Ser. No. 413,413
14 Claims. (Cl. 56—25.4)

This invention relates to a farm implement and more particularly to an implement for cutting and shredding cornstalks and grass or the like.

It is one of the principal objects of this invention to provide a shredder implement which will cut up trash or the like to any desired degree of fineness.

Another object of this invention is to provide a shredder implement having a rotating cutter bar provided with suction cups for drawing trash from the ground into the cutting blades on the cutter bar.

A related object of this invention is to provide a shredder implement having a cutter bar which is rotatable adjacent baffle plates formed on the lower side of the shredder implement.

A still further related object of this invention is to provide a rotatable cutting bar and a stationary cutting bar which cooperate with each other to give positive cutting action.

A still further object of this invention is to provide a shredding implement having cutting blades which are self cleaning.

Another related object of this invention is to provide a shredder implement having a rotatable cutting bar with cutting blades swingably connected thereto.

Still another object of this invention is to provide a shredder implement having a plurality of selectively adjustable doors along the side edges thereof to control the flow of cut material from the implement and thereby cut the material to the desired fineness and spread it over the ground in a desired pattern.

A related object of this invention is to provide a shredder implement having pivotal doors which extend diagonally rearwardly and inwardly from the side edges of the implement.

Yet another object of this invention is to provide a shredder implement having a frame with a plurality of flexible elements disposed along the forward edge which will freely pass over the material being cut but prevent undesired discharge of material from the cutting area under the shredder machine.

A related object of this invention is to provide a plurality of flexible elements along one edge which may all be removed simultaneously if desired.

Yet another object of this invention is to provide a shredder implement having a wheel support assembly which is readily adjustable to lower and raise the shredder implement.

Another object of this invention is to provide a shredder implement having a wheel assembly which is spring cushioned.

A still further object of this invention is to provide a shredder assembly having a wheel assembly which may be locked at a desired height to thereby relieve the strain on the lifting power means.

Yet another object of this invention is to provide a shredder implement which may be dropped from a raised position to a predetermined lowered position.

Yet another object of this invention is to provide a shredder implement having pivotal doors along the peripheral edges thereof which have channel portions formed therein for regulation and control of the cut material.

Another object of this invention is to provide a shredder implement having a plurality of chain elements swingably secured to one edge thereof and provided with means for maintaining them in spaced relationship to each other.

Yet another object of this invention is to provide a shredder implement having a plurality of chain elements disposed along one edge thereof with a flange element extending closely adjacent to the chain elements to serve as a dust guard.

A still further object of this invention is to provide a shredder implement which will not windrow cornstalks or the like after they have gone through the shredder implement.

Yet another object of this invention is to provide a shredder implement which is carried on a pair of wheels which are so located that the full weight of the shredder machine is on the wheels rather than the tractor or the like pulling the shredder implement.

A further object of this invention is to provide a shredder device which is simple in design, economical to manufacture and refined in appearance.

These and other objects will be apparent to those skilled in the art.

This invention consists in the construction, arrangements, and combination of the various parts of the device, whereby the objects contemplated are attained as hereinafter more fully set forth, specifically pointed out in the claims, and illustrated in the accompanying drawings, in which:

Figure 2:
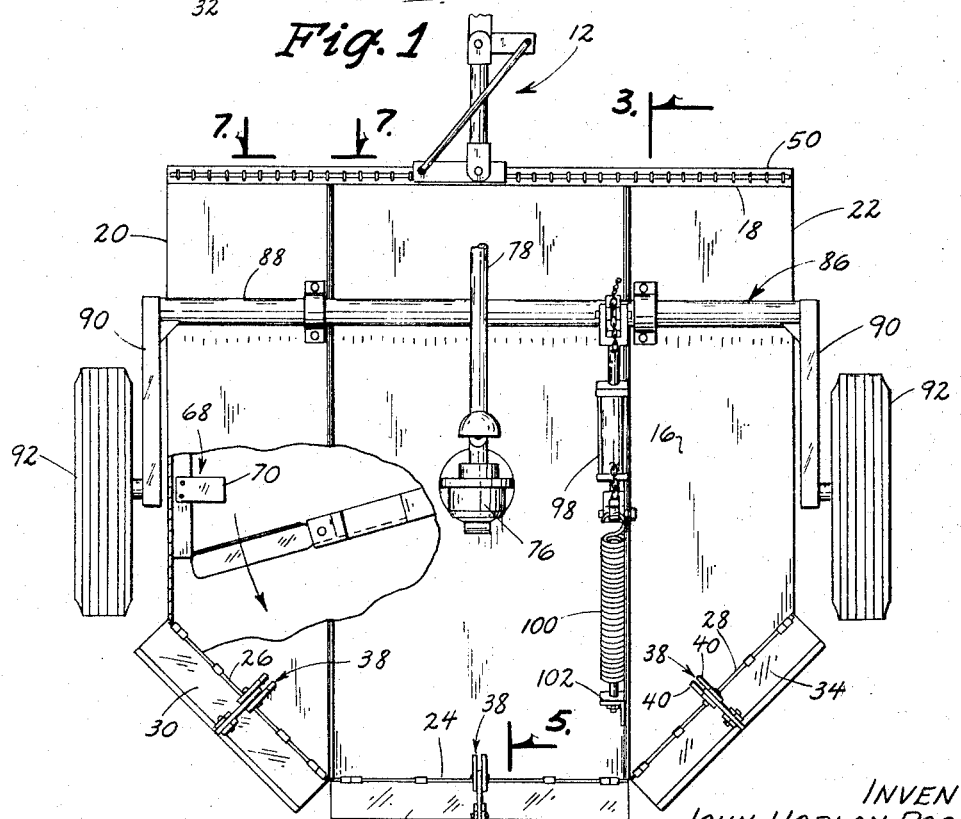
FIG. 2 is a fragmentary top plan view of the shredder implement only.
Figure 3:
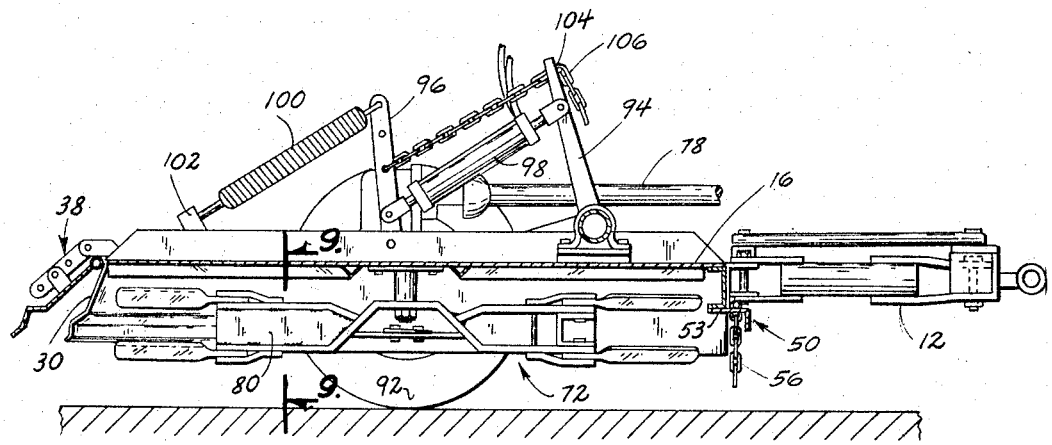
FIG. 3 is a side elevtaional view taken along line 3—3 in FIG. 2.
Figure 4:
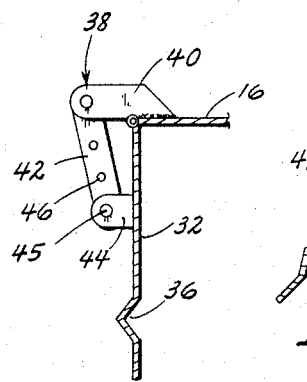
Figure 5:
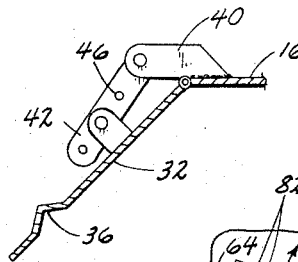
Figure 6:
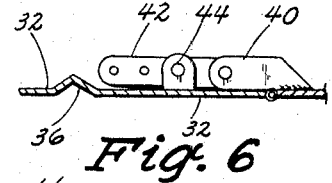
Figure 8:
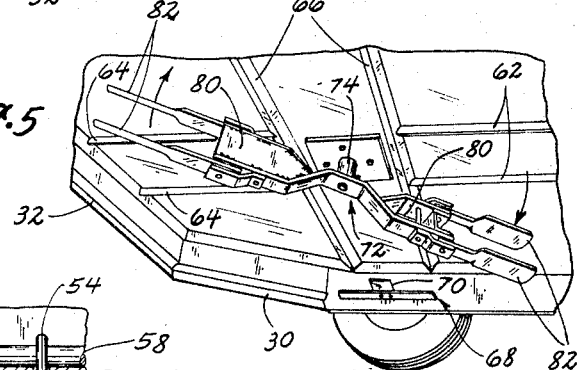
Figure 7:
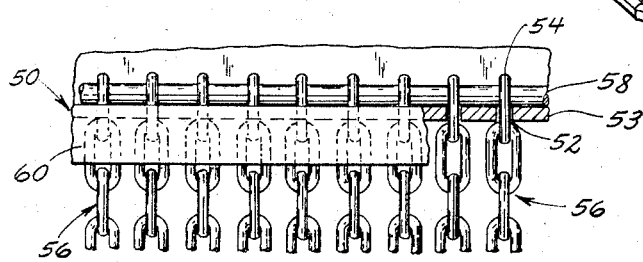
Figure 9:

FIGS. 4, 5 and 6 are side elevational views of the door member at the rear edge of the implement wherein FIG. 5 is taken along line 5—5 in FIG. 2 and FIGS. 4 and 6 are taken along a similar line but illustrate the door in alternate positions;

FIG. 7 is a fragmentary front end elevation view taken along line 7—7 in FIG. 2 and illustrating in particular the flexible chain elements secured along the front edge of the shredder implement;

FIG. 8 is a fragmentary perspective view of the underside of the shredder implement; and FIG. 9 is an elevational view taken along line 9—9 in FIG. 3 and illustrating the cross-section of the cutting blade assembly.

Figure 1:
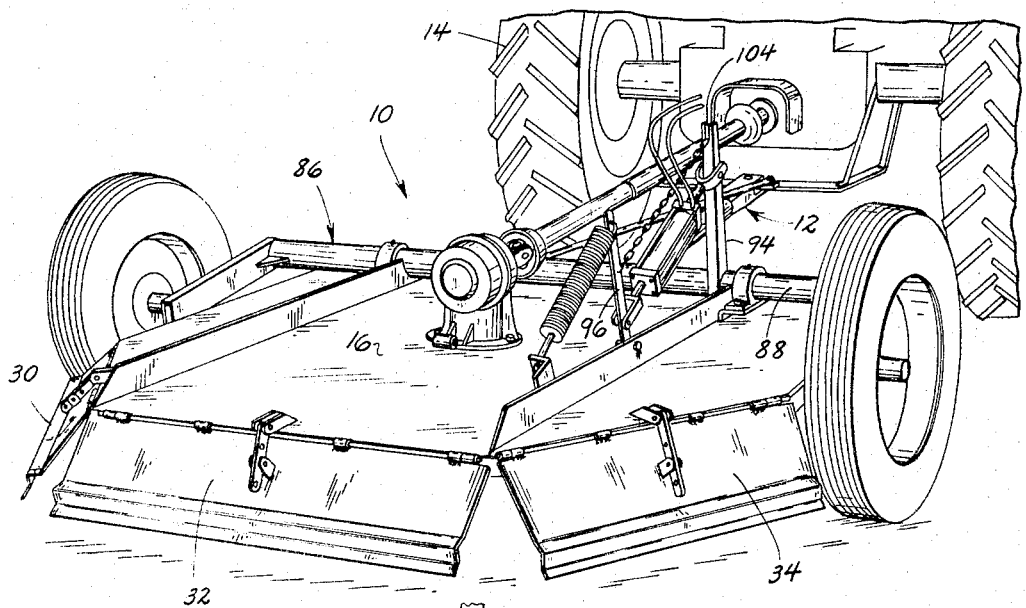
FIG. 1 is a perspective view of the shredder implement of this invention attached to a tractor.

In FIG. 1 the shredder implement is referred to generally by the reference numeral 10 and is shown connected through a hitch assembly 12 to a tractor 14. The hitch assembly 12 is the subject matter of applicant's co-pending application, Serial No. 311,764 filed Sept. 26, 1963.

The implement 10 includes a frame 16 having a front edge 18 and parallel side edges 20 and 22. The rear end of the horizontally disposed frame 16 is provided with a center edge portion 24 parallel to the front edge portion 18. Extending from the side edge portions 20 and 22 are diagonal edge portions 26 and 28 which terminate at opposite ends of the center edge portion 24.

Each of the edge portions 24, 26 and 28 are provided with pivotal doors 30, 32 and 34 respectively. Each of these doors are provided with an inwardly facing elongated V-shaped channel 36 adjacent the lower edge thereof. A latch means 38 is provided for each of the doors 30, 32 and 34 to hold them in any desired position as illustrated in FIGS. 4, 5 and 6. The latch assembly 38 includes a pair of parallel plate elements 40 welded to the top surface of the frame 16 and have outer ends extending rearwardly thereof. A link element 42 is pivotally connected at one end between the plates 40. A second pair of plates 44 are fixedly secured to the door 32 and receive therebetween the link element 42 for selective engagement through a pin 45 with one of several holes 46 formed along the length of the link element 42.

As illustrated in FIG. 3, a downwardly extending flange 50 extends along hte full length of the front edge 18 below the top surface of the frame 16. A plurality of slots 52 as illustrated in FIG. 7 are formed closely adjacent each other along the length of the horizontal portion 53 of the flange 50 and receive therethrough one link of each of a plurality of chains 56. An elongated rod 58 extends through the upper link 54 of the chains 56 and thereby hold the chains in position rearwardly of the downward extending vertical portion 60 of the flange 50.

As best illustrated in FIG. 8, a pair of spaced apart downwardly extending baffle plates 62 extend along the center of the frame 16 from the front edge 18 to adjacent the center thereof and a pair of similar plates 64 extend from the rear edge 24 to adjacent the center of the frame 16. Extending crosswise between the side edges 20 and 22 are a pair of baffle plates 66 which abut against the inner ends of thep lates 62 and 64.

As seen in FIGS. 2 and 8, a stationary cutting blade assembly 68 is secured to the frame 16 below the top thereof. The cutting blade assembly 68 includes a blade element 70 which extends horizontally inwardly from the side edge 20 of the frame 16.

A rotatable cutting blade assembly 72 is disposed below the frame 16 on a vertical drive shaft 74 which is connected to a gear assembly 76 on top of thef rame 16 which in turn is connected to the power take-off unit 78 extending to the tractor 14.

The rotatable cutting blade assembly 72 is adapted to rotate in the direction of the arrows in FIGS. 2 and 8 and is provided with a pair of suction cups 80 on opposite sides of the axis of rotation through the shaft 74. Suction cups 80 face in the opposite direction of the direction of rotational movement to thereby create the negative pressure in the area of the cups 80. A pair of vertically spaced blade elements 82 are pivotally connected to the top and bottom surfaces of the suction cups 80 and are so positioned to move past the stationary cutting blade 70 whereby it extends therebetween as illustrated in FIG. 2. Thus it is seen that the material being cut by the shredder 10 is subjected to four swinging blades and one stationary blade. As clearly shown in FIGS. 3 and 8, each of the blade elements 82 is inclined so that the leading cutting edge is disposed in a plane below that of the trailing edge. The inclination of the blade elements causes the material being shredded to be deflected or elevated upwardly. Thus, the lowermost blade element 82 at each end of the cutting blade assembly 72 elevates the material being shredded upwardly into contact with the uppermost blade element which doubles the shredding action.

The full weight of the shredder 10 is carried on its own wheel assembly 86 which includes a rocker shaft 88 extending crosswise of the forward end of the frame 16. A pair of downwardly and rearwardly extending arms 90 are connected at the outer ends of the rocker shaft 88 and are in turn connected at their lower free ends to wheels 92 disposed closely adjacent to the side edges 20 and 22 of the frame 16. An upwardly extending post 94 is affixed to the shaft 88 and is spaced from a similar upstanding member 96 pivotally connected rearwardly thereof to the frame 16. A hydraulic cylinder 98 is connected between the post 94 and the member 96. An elongated spring 100 extends rearwardly from the top of the member 96 to an anchor 102 adjacent the rear edge 24 of the frame 16. The upper end of the post 94 is provided with a notch 104 to receive the free end of a chain 106 which has its other end connected to the member 96. The individual links of the chain 106 may be selectively placed within the notch 104.

In operation it is thus seen that the implement 10 may be readily varied in its height above the ground. When the hydraulic cylinder 98 is extended the shredder 10 is lowered since the arms 90 carrying the wheels 92 are raised and conversely as the cylinder 98 is retracted against the action of the spring 100 the shredder 10 is raised. Once the shredder has been moved to its desired height, the chain 106 may be locked into position in the notch 104 and the cylinder 98 relaxed as the shredder unit 10 is then held in its raised position by the chain 106 linking the member 96 to the post 94. Also, when the shredder unit 10 is in its raised position the chain 106 may be left in its normal position and thereby making it possible to drop the shredder unit 10 by releasing the pressure on the cylinder 98 and the shredder 10 will automatically fall to the same height since it is fixed by the chain 106. The falling of the shredder 10 is cushioned by the spring 100. Similarly, when one of the wheels 92 hits an obstruction and is forced upwardly thereby forcing the post 94 forwardly the spring 100 comes into operation and cushions the impact forces.

By varying the doors 30, 32 and 34, it is possible to shred the material as desired. For example, opening the doors all of the way will give a coarse cut while closing the doors willp rovide fine chopping action. Moreover, the wider the door openings the farther the material will be thrown by the cutter blades.

A most important feature of this invention is the positive suction and cutting action that is made possible through the operation of the suction cups 80 which draw the material such as the trash up into the area of the cutting blades 82 and 70. The baffle plates 62, 64 and 66 serve to evenly distribute the shredded material under the shredder 10. It is also to be appreciated that the cutting blade assembly 72 is self-cleaning since in each revolution each of the blades 82 pass in overlapping relation by the cutting blade 70 whereby any material on the blade 82 is quickly removed.

In heavy cutting it is sometimes difficult to remove all of the cut material from under the shredder unit 10 and therefore the provision of the diagonally disposed doors 30 and 34 is especially important. Without these doors, much of the shredded material could not escape from under the shredder 10 since the distance from the cutting blade assembly 72 would be too great in the area of the diagonally disposed doors 30 and 34.

It is seen from the drawings that the plurality of chain members 56 along the front edge 18 are suitably adapted to pivotally pass over the ground surface but yet prevent the cutting blade assembly 72 from throwing cut material out the forward end of the shredder 10. Additionally, when it is desired to remove the flexible chains 56, it is only necessary to withdraw the rod 58 and all of the chains 56 will drop from the slots 52. The vertically disposed portion 60 of the flange 50 serves as a dust guard and prevents its escape forwardly of the shredder 10.

Some changes may be made in the construction and arrangement of our shredder implement without departing from the real spirit and purpose of our invention, and it is our intention to cover by our claims, any modified forms of structure or use of mechanical equivalents which may be reasonably included within their scope.

We claim:
1. In a shredding implement,
a horizontally disposed frame,
a cutting blade assembly rotatably secured to the lower side of said frame,
said frame having a front edge, a pair of parallel side edges and a rear edge,
said rear edge having a plurality of edge portions, at least two of said edge portions extending diagonally of said side edges, and
a door pivotally connected to each of said two diagonally extending side edge portions and adapted to move from a first position extending vertically downwardly to a second position extending rearwardly of said frame.

2. In a shredding implement, a horizontally disposed frame,
a cutting blade assembly rotatably secured to the lower side of said frame,
said frame having a front edge, a pair of parallel side edges and a rear edge,
said rear edge having a plurality of edge portions, one of said edge portions extending diagonally inwardly from one of said side edges and another of said edge portions extending diagonally inwardly from the other of said side edges, a third edge portion extending between said diagonally extending edge portions and said third edge portion extending in parallel relationship to said front edge portion,
a door pivotally and adjustably connected to each of said first, second, and third side edge portions and adapted to move from a first position extending vertically downwardly to a second position extendnig rearwardly of said frame, and
latch means for each of said doors whereby each of said doors may be selectively adjustable between said first and second positions.

3. The structure of claim 2 wherein each of said doors are provided with inwardly facing elongated V-shaped channels, each of said channels being parallel to the adjacent side edge portions and disposed outwardly therefrom adjacent the outer edge of said door.

4. The structure of claim 2 and a plurality of flexible elements being swingably secured to said front edge, said elements normally disposed in a vertical plane and extending downwardly from said frame.

5. The structure of claim 2 and a plurality of flexible elements being swingably secured to said front edge, said elements normally disposed in a vertical plane and extending downwardly from said frame, and a vertically disposed flange extending along the length of said front edge adjacent said elements and below said frame.

6. The structure of claim 2 and a rod detachably secured along the front edge of said frame, and a plurality of flexible elements swingably secured to said rod, said elements normally disposed in a vertical plane and extending downwardly from said frame.

7. The structure of claim 2 and a rod detachably secured along the front edge of said frame, and a plurality of flexible elements swingably secured to said rod, said elements normally disposed in a vertical plane and extending downwardly from said frame, said front edge having a plurality of notches formed therein to receive said elements and thereby limit relative movement therebetween along said rod.

8. In a shredding implement,
a horizontally disposed frame,
a cutting blade assembly disposed under said frame, and comprising an elongated member rotatably connected intermediate its ends to said frame, a pair of vertically spaced apart blade elements at each end of said member, and
a stationary blade member secured to said frame and horizontally disposed in a plane between the planes of said blade elements in each pair of blade elements, said blade member adapted to extend between each pair of blade elements as said elongated member is rotated and said pair of blade elements pass by said blade member, said blade member having a thickness substantially less than the distance between each pair of blades.

9. The structure of claim 8 wherein each of said blade elements is further defined as being swingably connected to said member at each end thereof.

10. The structure of claim 8 and said frame is provided with a plurality of downwardly extending baffle plates on the under side thereof adjacent said blade member, said baffle plates being positioned above the horizontal planes of said pairs of blades.

11. The structure of claim 8 and said frame is provided with a plurality of downwardly extending baffle plates on the under side thereof adjacent said blade member, said baffle plates including two pairs of baffle plates, one pair of plates extending perpendicularly to the other pair of plates and the plates within each pair of plates being spaced apart, and the axis of rotation of said blade assembly extending through the center of said two pairs of baffle plates.

12. In a shredding implement,
a horizontally disposed frame,
a cutting blade assembly rotatably secured to the lower side of said frame,
said frame having a front edge, a pair of parallel side edges and a rear edge,
a rocker shaft rotatably secured to said frame adjacent said front edge,
an arm perpendicularly secured to each end of said shaft, said arms being disposed outwardly adjacent said side edges, said arms extending downwardly and rearwardly of said shaft,
a wheel rotatably connected to the free end of each arm,
an upstanding post secured to said shaft,
an upstanding member pivotally connected at one end to said frame rearwardly of said shaft,
a spring means connected to said upstanding member tending to pivot it rearwardly,
a hydraulic power means connected at its opposite ends between and to said upstanding post and said upstanding member,
said hydraulic power means upon being extended lowering said frame and upon being shortened raising said frame against the action of said spring, and
said spring serving to absorb impact forces received by said wheels which tends to move said arms upwardly.

13. The structure of claim 12 and a flexible member is adjustably secured to and between said upstanding post and said upstanding member to limit the relative pivotal movement therebetween in opposite directions and thereby permit said hydraulic power means to be relaxed, and said flexible member having a predetermined maximum length.

14. The structure of claim 8 wherein a suction cup is provided between and inwardly adjacent each pair of blade elements and said suction cups face in the opposite direction of said blade assembly rotation.

References Cited

UNITED STATES PATENTS

| | | | |
|---|---|---|---|
| 2,701,942 | 2/1955 | Caldwell et al. | 56—503 X |
| 2,743,567 | 5/1956 | Martin | 56—25.4 X |
| 2,806,339 | 9/1957 | Whitney | 56—25.4 |
| 2,815,631 | 12/1957 | Northcote et al. | 56—25.4 |
| 2,818,269 | 12/1957 | Northcote et al. | 56—25.4 X |
| 2,902,814 | 9/1959 | Lewis et al. | 56—25.4 |
| 3,015,927 | 1/1962 | Caldwell | 56—25.4 |
| 3,053,033 | 9/1962 | Maguire | 56—25.4 |

ANTONIO F. GUIDA, *Primary Examiner.*

ABRAHAM G. STONE, *Examiner.*